United States Patent

Yamada et al.

[11] Patent Number: 6,064,563
[45] Date of Patent: May 16, 2000

[54] ELECTROLYTIC CAPACITOR WITH OPEN CIRCUIT MODE MECHANISM

[75] Inventors: Morihiro Yamada; Hiroshi Kurimoto, both of Hirakata; Masaharu Minami, Uji, all of Japan

[73] Assignee: Matsushita Electric Industrial Co., Ltd., Osaka, Japan

[21] Appl. No.: 09/066,345

[22] PCT Filed: Oct. 24, 1996

[86] PCT No.: PCT/JP96/03093

§ 371 Date: Jan. 22, 1999

§ 102(e) Date: Jan. 22, 1999

[87] PCT Pub. No.: WO97/16837

PCT Pub. Date: May 9, 1997

[30] Foreign Application Priority Data

Oct. 30, 1995 [JP] Japan .................................. 7-281266

[51] Int. Cl.[7] .............................. H01G 9/12; H01G 9/10
[52] U.S. Cl. ...................... 361/521; 361/520; 361/536; 361/537
[58] Field of Search .................................... 361/272, 521, 361/517, 518, 519, 520, 535, 536, 537, 538, 539

[56] References Cited

U.S. PATENT DOCUMENTS

| | | | |
|---|---|---|---|
| 4,059,848 | 11/1977 | Koel et al. | 361/517 |
| 4,486,809 | 12/1984 | Deak et al. | 361/517 |
| 4,538,025 | 8/1985 | Coe et al. | 174/52 |
| 4,609,973 | 9/1986 | Testi | 361/433 |
| 4,698,725 | 10/1987 | MacDougall et al. | 361/517 |
| 4,754,361 | 6/1988 | Venturini | 361/517 |
| 5,148,347 | 9/1992 | Cox et al. | 361/517 |

*Primary Examiner*—Kristine Kincaid
*Assistant Examiner*—Eric W. Thomas
*Attorney, Agent, or Firm*—Wenderoth, Lind & Ponack, L.L.P.

[57] ABSTRACT

An electrolytic capacitor (K1–K3) with an open circuit mode mechanism, comprises: a metallic casing (32; 52; 62) for accommodating a capacitor element (31; 51; 61); an upper lid (33; 53; 63) which is mounted on a mouth of the metallic casing; a pair of metallic rivets (35; 54; 65) which are secured to the upper lid; a pair of external connection terminals (39; 55; 70) each of which is connected to one end portion of each of the metallic rivets; and a fixing member (40; 56; 71) which is molded by resin and is formed with a pair of through-holes (41; 57; 72) each for passing the other end portion of each of the metallic rivets therethrough such that the other end of each of the metallic rivets projecting out of the fixing member is connected, by metallic junction, to each of a pair of lead-out lead plates (42; 58; 73) drawn from the capacitor element. In case pressure in the metallic casing rises due to a malfunction of the electrolytic capacitor, the upper lid is deformed by this rise of the pressure, so that the metallic rivets are lifted in a direction away from the capacitor element upon this deformation of the upper lid and thus, the metallic junction between the other end of each of the metallic rivets and each of the lead-out lead plates is cut off, thereby resulting in break of an electric circuit of the electrolytic capacitor.

12 Claims, 11 Drawing Sheets

6,064,563

1

ELECTROLYTIC CAPACITOR WITH OPEN CIRCUIT MODE MECHANISM

TECHNICAL FIELD

The present invention relates to an electrolytic capacitor with an open circuit mode mechanism, in which at the time the electrolytic capacitor malfunctions, an upper lid is deformed due to rise of pressure in a metallic casing so as to break an electric circuit in the casing.

BACKGROUND ART

A conventional aluminum electrolytic capacitor has been arranged as shown in FIG. 8. Namely, in FIG. 8, a capacitor element 1 is impregnated with driving electrolyte and two lead-out lead plates 2a and 2b are drawn from the capacitor element 1. A mouth sealing member 3 for sealing a mouth of a cylindrical metallic casing 9 made of, for example, aluminum and having a bottom is formed by laminating a rubber plate 3a and a resinous plate 3b integrally, while a-pair of metallic rivets 4a made of, for example, aluminum and a pair of metallic rivets 4b made of, for example, aluminum are pierced through the mouth sealing member 3. An external connecting terminal 5a is connected to one end of one of the rivets 4a and the lead-out lead plate 2a is connected to the other end of the one of the rivets 4a by crimping through metallic washers 6a and 7a made of, for example, aluminum. Likewise, an external connecting terminal 5b is connected to one end of one of the rivets 4b and the lead-wire lead plate 2b is connected to the other end of the one of the rivets 4b by crimping through metallic washers 6b and 7b made of, for example, aluminum. The capacitor element 1 and the mouth sealing member 3 provided integrally in this way are accommodated in the metallic casing 9 containing fixing agent 8. The metallic casing 9 is subjected to transverse drawing in the vicinity of the mouth. A distal end of the mouth of the metallic casing 9 is subjected to curling so as to retain the mouth sealing member 3. Meanwhile, a weak spot (not shown) formed by a thin wall portion is provided on the bottom of the metallic casing 9.

In case a voltage higher than its rated voltage is applied to the conventional aluminum electrolytic capacitor, temperature in the metallic casing 9 rises, so that organic solvent forming the driving electrolyte impregnated in the capacitor element 1 is vaporized and hydrogen gas is generated by electrochemical reaction. As a result, internal pressure of the metallic casing 9 accommodating the capacitor element 1 rises. If the internal pressure of the metallic casing 9 rises excessively, the weak portion provided on the bottom of the metallic casing 9 is ruptured, so that the organic solvent gas flows out of the metallic casing 9 through the ruptured weak portion, thereby resulting in prevention of a tremendous explosion of the metallic casing 9.

However, in the above known aluminum electrolytic capacitor, since the driving electrolyte gas spouts out of the metallic casing 9 in misty state, such problems arise that this spouted misty driving electrolyte gas soils interior of an electronic appliance incorporating the known aluminum electrolytic capacitor and is mistaken for smoke due to a fire.

In order to solve these problems of the known aluminum electrolytic capacitor, an electrolytic capacitor with an open circuit mode mechanism as shown in FIGS. 9A and 9B is proposed in, for example, Japanese Utility Model Publication No. 6-39446 (1994). This prior art electrolytic capacitor with the open circuit mode mechanism is arranged as follows. Namely, in FIG. 9A, a capacitor element 12 is accommodated in a metallic casing 11 and a metallic upper lid 14 is hermetically mounted on an upper peripheral edge of a mouth of the metallic casing 11 through an annular elastic packing 13. A pair of first rivets 15 are pierced through the metallic upper lid 14 and each of the first rivets 15 is a composite rivet in which a metallic rivet 15b made of iron or metal other than aluminum is press fitted into an opening of an aluminum hollow rivet 15a so as to be welded to the aluminum hollow rivet 15a. Each of the first rivets 15 not only is hermetically mounted on the metallic upper lid 14 but is electrically insulated from the metallic upper lid 14 by a silicone rubber piece 17 which is compressedly gripped between an insulating member 16 molded by resin and the aluminum hollow rivet 15a.

Meanwhile, an external terminal 18 is welded to an upper end of the metallic rivet 15b. An aluminum foil plate 19 having a weak portion is welded to the aluminum hollow rivet 15a and is fixed, through an aluminum washer 23, to a lead-out lead foil plate 22 from the capacitor element 12 by a second rivet 21 mounted on a fixing plate 20 molded by resin so as to be connected to the lead-out lead foil plate 22.

In the prior art electrolytic capacitor with the open circuit mode mechanism as shown in FIG. 9A, in case pressure in the metallic casing 11 rises due to a malfunction in the prior art electrolytic capacitor as shown in FIG. 9B, the metallic upper lid 14 is deformed greatly to swell out upwardly upon rise of the pressure in the metallic casing 11. Therefore, in response to this upward deformation of the metallic upper lid 14, the first rivet 15 which not only is hermetically mounted on the metallic upper lid 14 but is electrically insulated from the metallic upper lid 14 by the compressed silicone rubber piece 17 is also deformed upwardly, so that the aluminum foil plate 19 welded to the aluminum hollow rivet 15a of the first rivet 15 is pulled upwardly and thus, is cut off at the weak portion. As a result, connection between the aluminum foil plate 19 and the lead-out lead foil plate 22 from the capacitor element 22 is cut and thus, an electric circuit of the prior art electrolytic capacitor is broken.

However, in the prior art electrolytic capacitor with the open circuit mode mechanism as shown in FIGS. 9A and 9B, as many as six components, i.e., the metallic rivet 15b and the aluminum hollow rivet 15a of the first rivet 15, the aluminum foil plate 19, the second rivet 21, the aluminum washer 23 and the lead-out lead foil plate 22 are provided in a flow path of electric current from the external terminal 18 to the capacitor element 12, structure of the prior art electrolytic capacitor is made complicated and the number of its assembly steps also increases. Meanwhile, the prior art electrolytic capacitor has such a disadvantage that the number of connections of the six components reaches as many as five, thereby resulting in poor reliability of connections of the components.

Meanwhile, when the open circuit mode mechanism is actuated, the metallic upper lid 14 is deformed so as to swell out upwardly as shown in FIG. 9B, interval between a pair of the external terminals 18 is increased. Therefore, in case the external terminals 18 are restricted by holes of a printed circuit board or the like, such inconveniences are incurred that the open circuit mode mechanism malfunctions and the printed circuit board is damaged by the external terminals 18 upon increase of interval between the external terminals 18.

Furthermore, since the aluminum foil plate 19 having the weak portion of small cross-sectional area for reducing its mechanical strength is provided in the course of the electric circuit for passing large AC therethrough from the external terminal 18 to the capacitor element 12, electric resistance rises at the weak portion and thus, the weak portion is heated by the AC. As a result, the prior art electrolytic capacitor has such a disadvantage that ripple current (AC) capacity, one of basic features of the electrolytic capacitor is sacrificed.

DISCLOSURE OF INVENTION

Accordingly, the present invention has for its object to provide, with a view to eliminating the above mentioned disadvantages inherent in prior art, an electrolytic capacitor with an open circuit mode mechanism functioning properly, in which the number of connections among components in a flow path of electric current from an external connection terminal to a capacitor element is reduced greatly and a weak spot having a reduced cross-sectional area is eliminated from the flow path of electric current.

This object and features of the present invention will become clear from the following description taken in conjunction with the preferred embodiments thereof with reference to the accompanying drawings throughout which like parts are designated by like reference numerals.

BEST MODE FOR CARRYING OUT THE INVENTION

Figure 1:
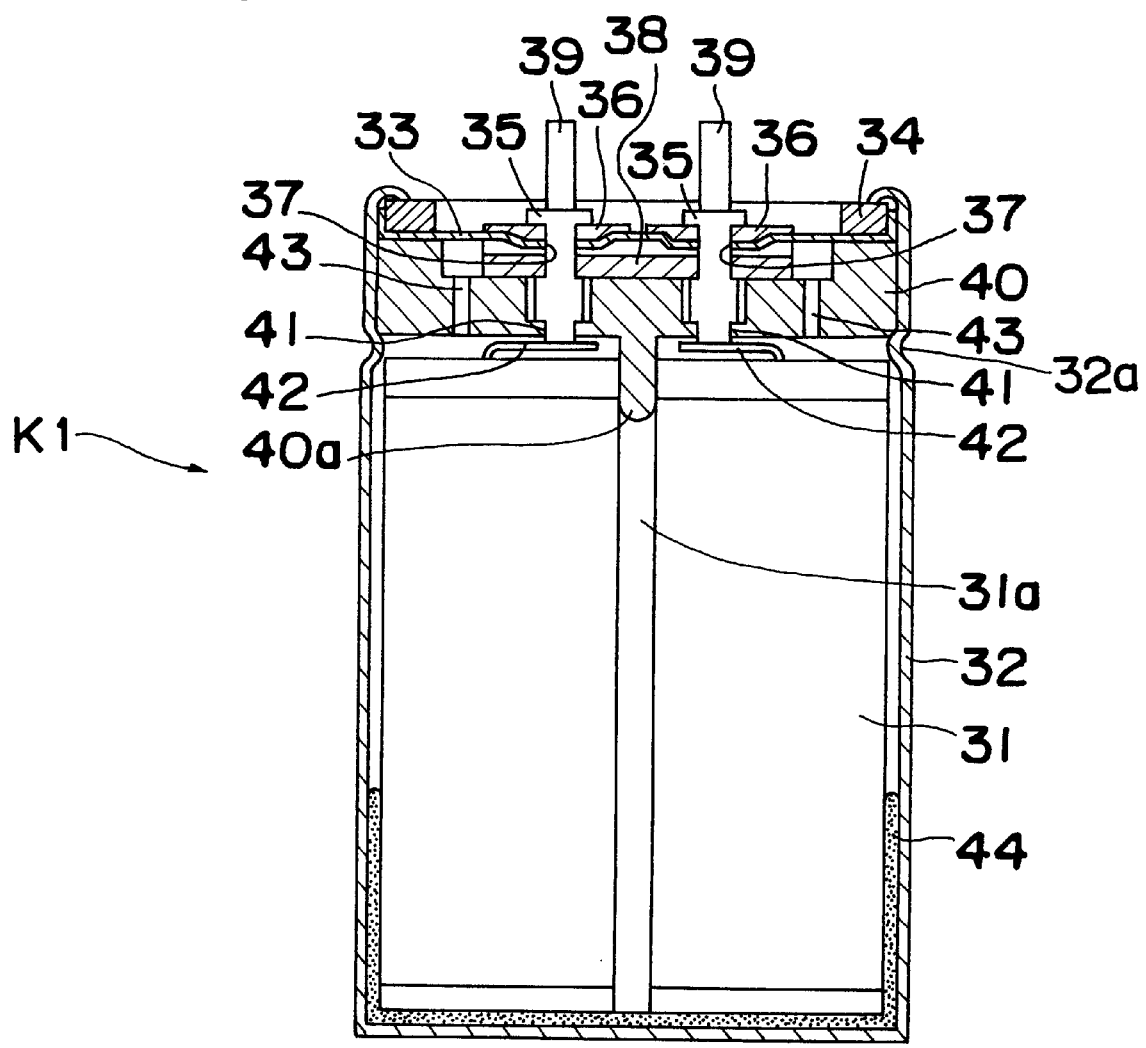
FIG. 1 is a longitudinal sectional view of an electrolytic capacitor with an open circuit mode mechanism, according to a first embodiment of the present invention.

Hereinafter, preferred embodiments of the present invention are described with reference to the attached drawings.
First Embodiment FIG. 1 shows an electrolytic capacitor K1 with an open circuit mode mechanism, according to a first embodiment of the present invention. In FIG. 1, an anode foil and a cathode foil are wound so as to interpose a separator therebetween in a capacitor element 31. After the capacitor element 31 has been impregnated with driving electrolyte, the capacitor element 31 is accommodated in a cylindrical metallic casing 32 made of, for example, aluminum and having a bottom. A metallic upper lid 33 for closing a mouth of the metallic casing 32 is mounted on the mouth of the metallic casing 32 through an annular packing 34 made of elastic rubber. An insulating member 36 molded by phenol resin is attached to one end portion of each of a pair of metallic rivets 35 made of, for example, aluminum so as to partially penetrate into each of a pair of through-holes 37 formed on the upper lid 33.

In order to fix the metallic rivets 35 to the upper lid 33, each of the metallic rivets 35 is pierced through the upper lid 33 via the insulating member 36. Then, the other end portion of each of the metallic rivets 35 is pierced through a resinous molded member formed integrally by elastic rubber or a resinous laminated board 38 of rubber bonding. Subsequently, by crimping the other end portion of each of the metallic rivets 35, the metallic rivets 35 are hermetically fixed to the upper lid 33 so as to be electrically insulated from the upper lid 33. An external connection terminal 39 is connected to the one end portion of each of the metallic rivets 35. A fixing member 40 molded by resin is formed with a pair of through-holes 41 each for passing the other end portion of each of the metallic rivets 35 therethrough. The other end of each of the metallic rivets 35 passing through the through-holes 41 of the fixing member 40 and projecting out of the fixing member 40 in the direction opposite to the upper lid 33 and each of a pair of lead-out lead plates 42 drawn from the capacitor element 31 are subjected to metallic junction by ultrasonic welding so as to be electrically connected to each other. The through-hole 41 of the fixing member 40 is set at a diameter of such a small dimensional allowance that the other end portion of each of the metallic rivets 35 can be barely inserted thereinto.

A projection 40a is integrally formed at a substantially central portion of the fixing member 40 and is inserted into a winding core cavity 31a of the capacitor element 31 so as to secure the capacitor element 31 to the fixing member 40. A plurality of communication holes 43 for forming communication between the capacitor element 31 and the upper lid 33 are formed on the fixing member 40. The capacitor element 31, the fixing member 40, the metallic rivets 35, the upper lid 33, etc. provided integrally as described above are accommodated in the metallic casing 32 which contains fixing agent 44 and is subjected to transverse drawing in the vicinity of the mouth so as to have a transverse drawing portion 32a. A distal end of the mouth of the metallic casing 32 is subjected to curling so as to retain the fixing member 40, the upper lid 33, etc.

In the electrolytic capacitor K1 with the open circuit mode mechanism, according to the first embodiment of the present invention as shown in FIG. 1, in case pressure in the metallic casing 32 rises due to a malfunction of the electrolytic capacitor K1, the pressure is applied to the upper lid 33 through the communication holes 43 of the fixing member 40 so as to deform the upper lid 33 such that the upper lid 33 swells out upwardly. In response to this deformation of the upper lid 33, the metallic rivets 35 secured to the upper lid 33 are also pulled upwardly by the upper lid 33, so that the connections of ultrasonic welding between the lead-out lead plates 42 from the capacitor element 31 disposed below the fixing member 40 and the metallic rivets 35 are pulled upwardly by the metallic rivets 35. In this case, the through-hole 41 for inserting the metallic rivet 35 therethrough in the fixing member 40 is set at an area smaller than that of the lead-out lead plate 42 at the connection between the lead-out lead plate 42 and the metallic rivet 35. Therefore, even if the lead-out lead plate 42 would penetrate into the through-hole 41 in response to upward deformation of the metallic rivet 35, the lead-out lead plate 42 is not capable of penetrating into the through-hole 41. As a result, the connection of ultrasonic welding between each of the metallic rivets 35 and each of the lead-out lead plates 42 is cut off by an edge of each of the through-holes 41 and thus, an electric circuit of the electrolytic capacitor K1 is broken.

Accordingly, the electrolytic capacitor K1 eliminates such drawbacks of an prior art electrolytic capacitor including a metallic casing having a weak spot formed by a thin wall portion of the bottom that misty driving electrolyte spouted out of the metallic casing soils interior of an electronic appliance incorporating the prior art electrolytic capacitor and is mistaken for smoke due to a fire.

Second Embodiment

Figure 2:
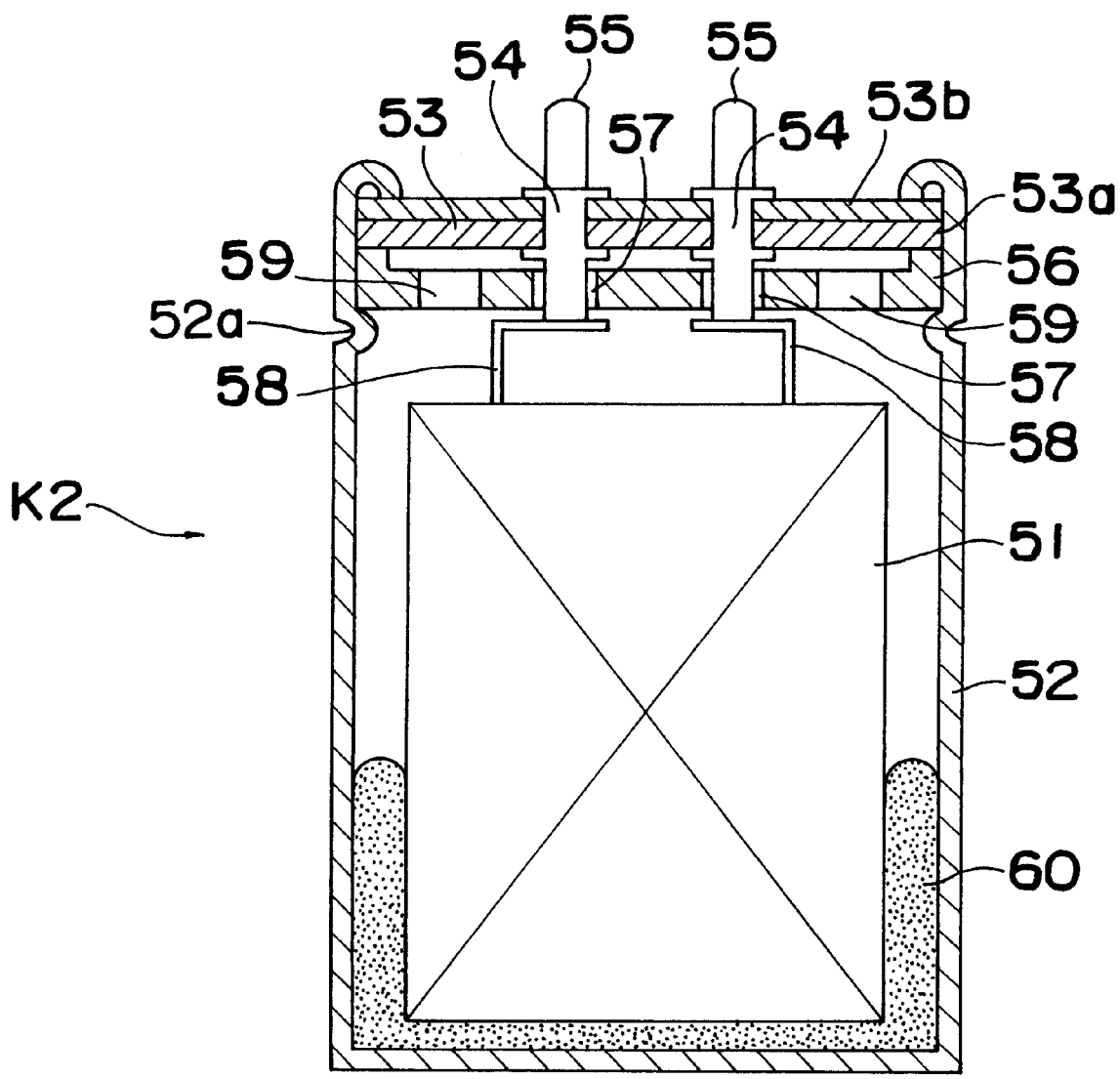
FIG. 2 is a longitudinal sectional view of an electrolytic capacitor with an open circuit mode mechanism, according to a second embodiment of the present invention.

FIG. 2 shows an electrolytic capacitor K2 with an open circuit mode mechanism, according to a second embodiment of the present invention. In FIG. 2, an anode foil and a cathode foil are wound so as to interpose a separator therebetween in a capacitor element 51. After the capacitor element 51 has been impregnated with driving electrolyte, the capacitor element 51 is accommodated in a cylindrical metallic casing 52 made of, for example, aluminum and having a bottom. A mouth sealing member 53 for closing a mouth of the metallic casing 52 and is formed by integrally laminating a rubber plate 53b on a baking plate 53a. This mouth sealing member 53 performs three functions of the metallic upper lid 33, the insulating member 36 molded by phenol resin and the resinous laminated board 38 of the electrolytic capacitor K1 of FIG. 1. By employing the mouth sealing member 53, the electrolytic capacitor K2 is made structurally simpler than the electrolytic capacitor K1.

A pair of metallic rivets 54 made of, for example, aluminum are pierced through the mouth sealing member 53. By crimping portions of each of the metallic rivets 54 projecting from the mouth sealing member 53 upwardly and downwardly, respectively, each of the metallic rivets 54 is secured to the mouth sealing member 53. An external connection terminal 55 is connected to one end portion of each of the metallic rivets 54. A fixing member 56 molded by resin is formed with a pair of through-holes 57 each for passing the other end portion of each of the metallic rivets 54 therethrough. The other end of each of the metallic rivets 54 passing through the through-holes 57 of the fixing member 56 and projecting out of the fixing member 56 in the direction opposite to the mouth sealing member 53 and each of lead-out lead plates 58 drawn from the capacitor element 51 are subjected to metallic junction by ultrasonic welding so as to be electrically connected to each other. The through-hole 57 of the fixing member 56 is set at a diameter of such a small dimensional allowance that the other end portion of each of the metallic rivets 54 can be barely inserted thereinto. A plurality of communication holes 59 for forming communication between the capacitor element 51 and the mouth sealing member 53 are formed on the fixing member 56.

The capacitor element 51, the fixing member 56, the metallic rivets 54 and the mouth sealing member 53 provided integrally as described above are accommodated in the metallic casing 52 which contains fixing agent 60 and is subjected to transverse drawing in the vicinity of the mouth so as to have a transverse drawing portion 52a. A distal end of the mouth of the metallic casing 52 is subjected to curling so as to retain the fixing member 56 and the mouth sealing member 53.

In the electrolytic capacitor K2 with the open circuit mode mechanism, according-to the second embodiment of the present invention as shown in FIG. 2, in case pressure in the metallic casing 52 rises due to a malfunction of the electrolytic capacitor K2, the pressure is applied to the mouth sealing member 53 through the communication holes 59 of the fixing member 56 so as to deform the mouth sealing member 53 such that the mouth sealing member 53 swells out upwardly. In response to this deformation of the mouth sealing member 53, the metallic rivets 54 secured to the mouth sealing member 53 are also pulled upwardly by the mouth sealing member 53, so that the connections of ultrasonic welding between the lead-out lead plate 58 from the capacitor element 51 disposed below the fixing member 56 and the metallic rivets 54 are pulled upwardly by the metallic rivets 54. In this case, the through-hole 57 for inserting the metallic rivet 54 therethrough in the fixing member 56 is set at an area smaller than that of the lead-out lead plate 58 at the connection between the lead-out lead plate 58 and the metallic rivet 54. Therefore, even if the lead-out lead plate 58 would penetrate into the through-hole 57 in response to upward deformation of the metallic rivet 54, the lead-out lead plate 58 is not capable of penetrating into the through-hole 57. As a result, the connection of ultrasonic welding between each of the metallic rivets 54 and each of the lead-out lead plates 58 is cut off by an edge of each of the through-holes 57 and thus, an electric circuit of the electrolytic capacitor K2 is broken.

Accordingly, the electrolytic capacitor K2 eliminates such drawbacks of the prior art electrolytic capacitor including the metallic casing having the weak spot formed by the thin wall portion of the bottom that misty driving electrolyte spouted out of the metallic casing soils interior of the electronic appliance incorporating the prior art electrolytic capacitor and is mistaken for smoke due to a fire.

Third Embodiment

Figure 3A:
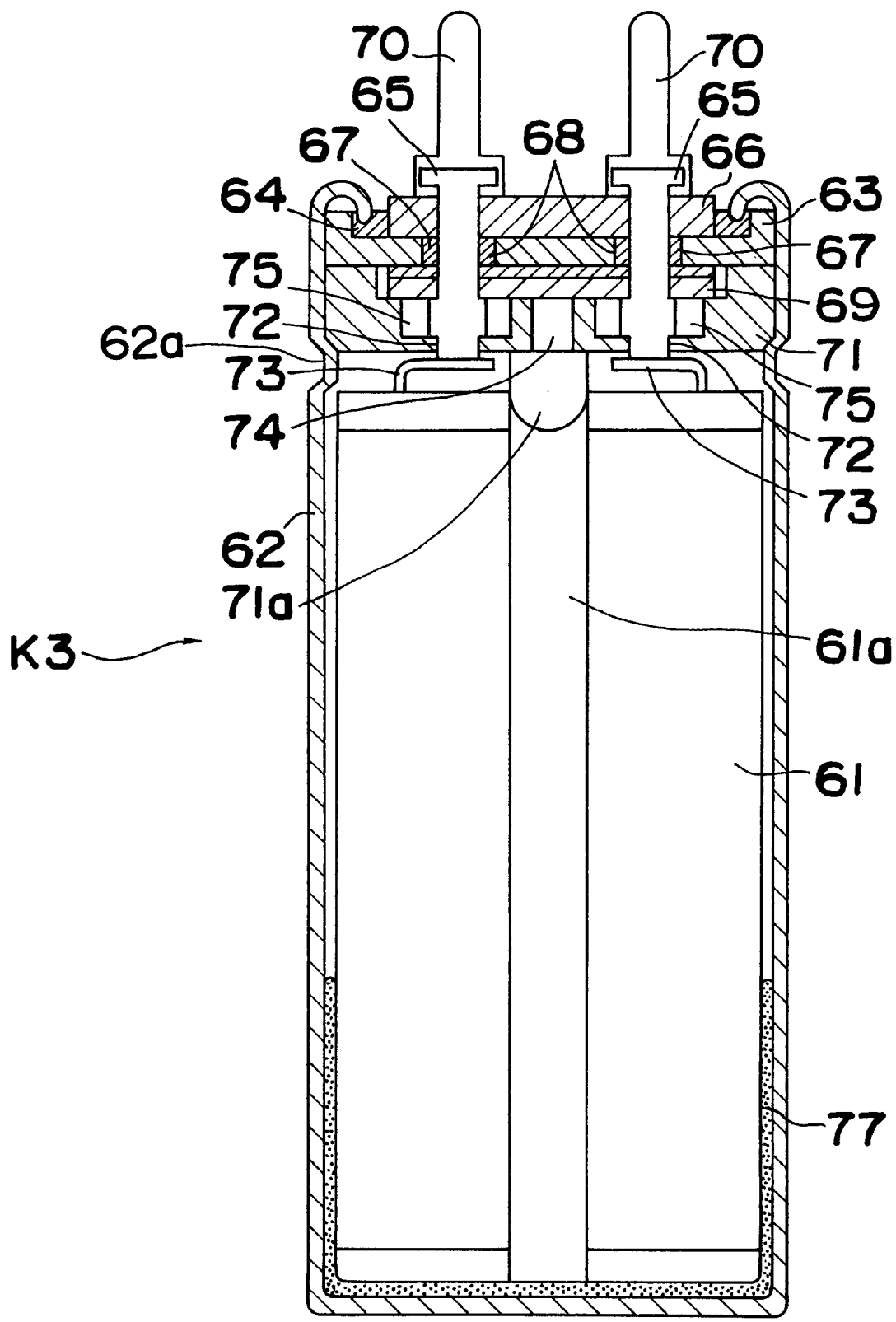
FIGS. 3A and 3B are longitudinal sectional views of an electrolytic capacitor with an open circuit mode mechanism, according to a third embodiment of the present invention.
Figure 3B:
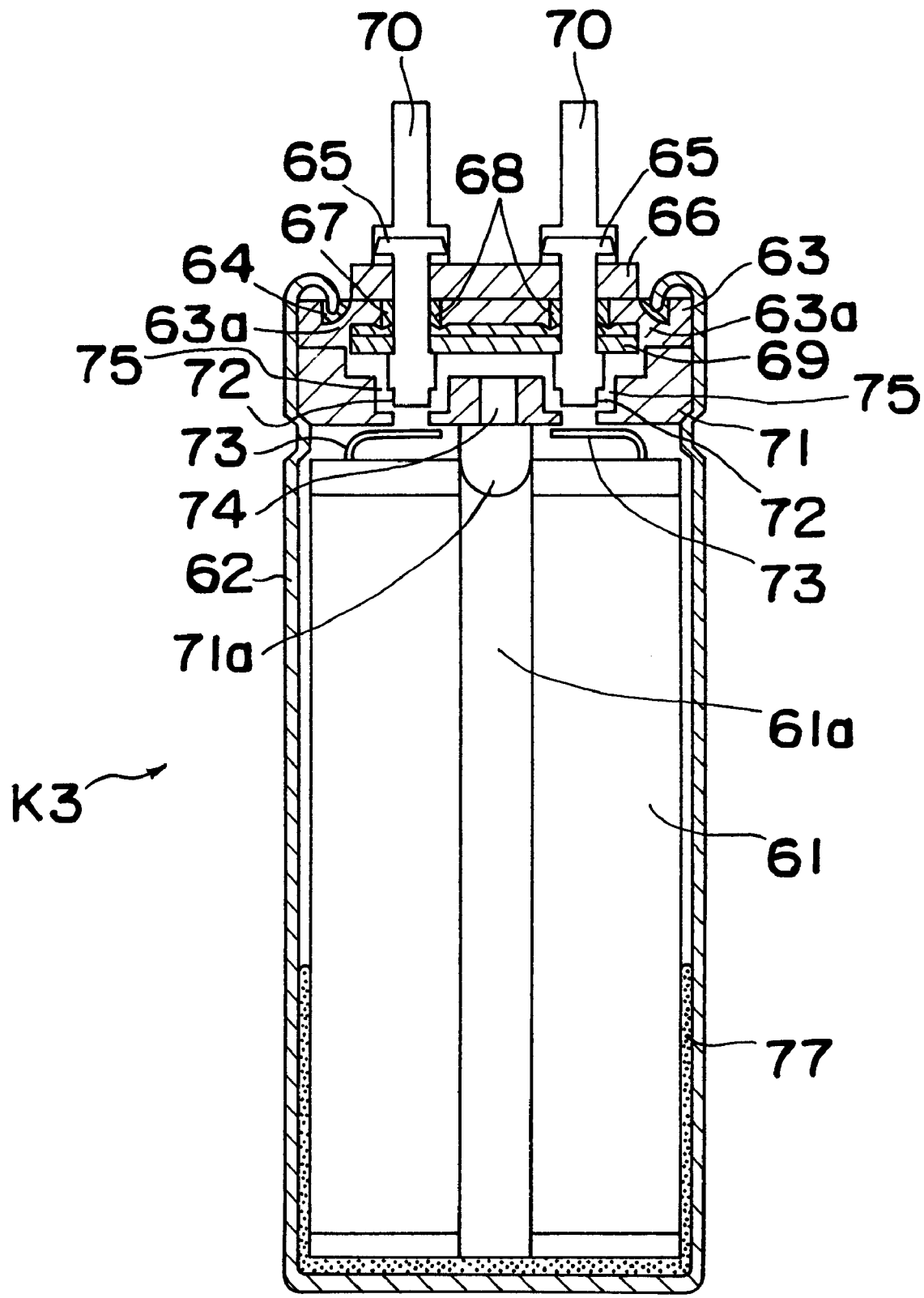

FIGS. 3A and 3B show an electrolytic capacitor K3 with an open circuit mode mechanism, according to a third embodiment of the present invention. In FIG. 3A, an anode foil and a cathode foil are wound so as to interpose a separator therebetween in a capacitor element 61. After the capacitor element 61 has been impregnated with driving electrolyte, the capacitor element 61 is accommodated in a cylindrical metallic casing 62 made of, for example, aluminum and having a bottom. A metallic upper lid 63 for closing a mouth of the metallic casing 62 is mounted on the mouth of the metallic casing 62 through an annular packing 64 made of elastic rubber. An insulating member 66 molded by phenol resin is attached to one end portion of each of a pair of metallic rivets 65 made of, for example, aluminum. An insulating ring 67 is press fitted into each of a pair of through-holes 68 formed on the upper lid 63.

In order to fix the metallic rivets 65 to the upper lid 63, each of the metallic rivets 65 is pierced through the insulating ring 67 via the insulating member 66. Then, the other end portion of each of the metallic rivets 65 is pierced through a resinous laminated board 69 of rubber bonding. Subsequently, by crimping the other end portion of each of the metallic rivets 65, the metallic rivets 65 are hermetically fixed to the upper lid 63 so as to be electrically insulated from the upper lid 63. An external connection terminal 70 is connected to the one end portion of each of the metallic rivets 65. A fixing member 71 molded by resin is formed with a pair of through-holes 72 each for passing the other end portion of each of the metallic rivets 65 therethrough. The other end of each of the metallic rivets 65 passing through the through-holes 72 of the fixing member 71 and projecting out of fixing member 71 in the direction opposite to the upper lid 63 and each of a pair of lead-out lead plates 73 drawn from the capacitor element 61 are subjected to metallic junction by ultrasonic welding so as to be electrically connected to each other. The through-hole 72 of the fixing member 71 is set as a diameter of such a small dimensional allowance that the other end portion of each of the metallic rivets 65 can be barely inserted thereinto.

Figure 4:
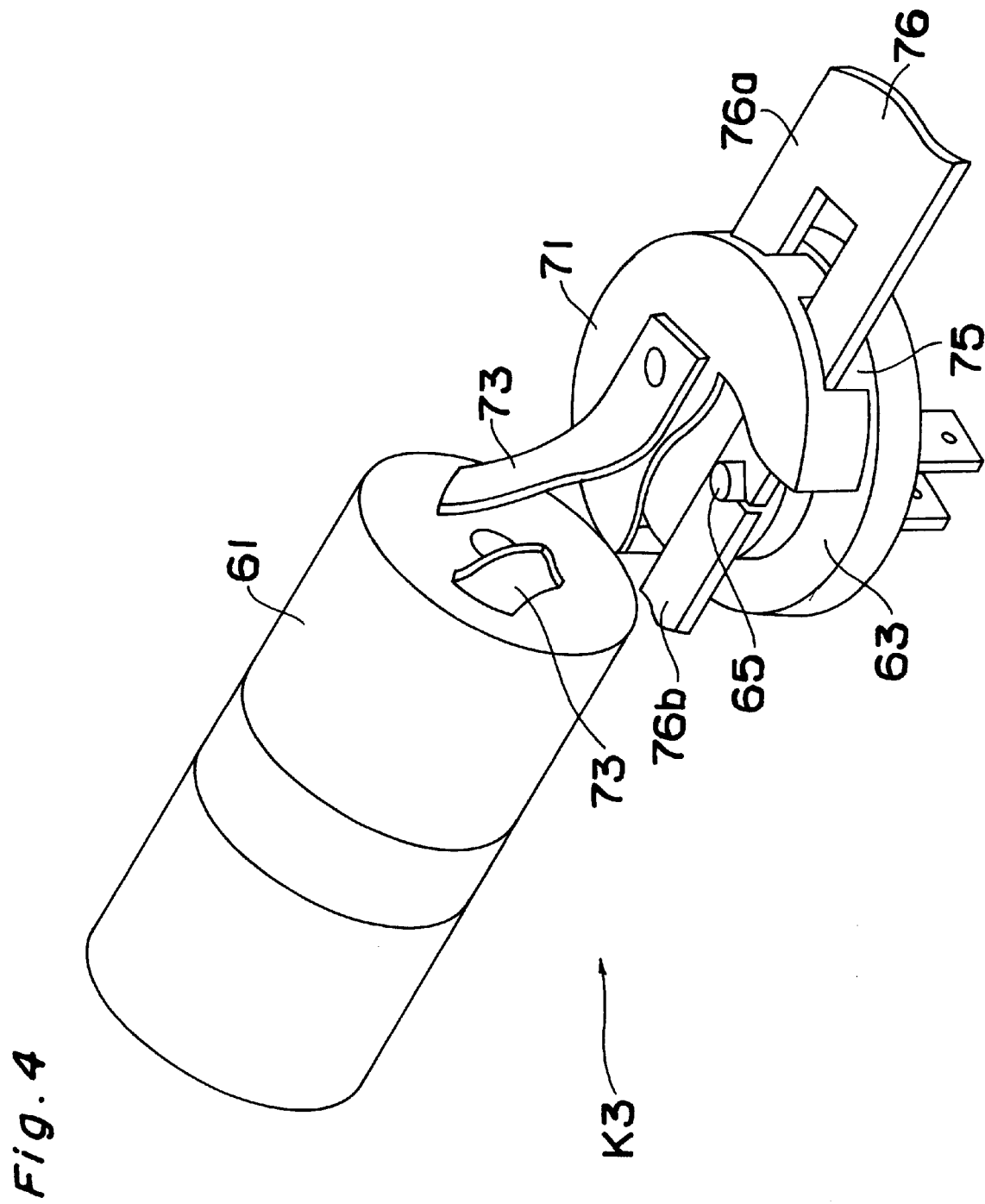
FIG. 4 is a partially broken fragmentary perspective view of the electrolytic capacitor of FIG. 3A.

A projection 71a is integrally formed a substantially central portion of the fixing member 71 and is inserted into a winding core cavity 61a of the capacitor element 61 so as to secure the capacitor element 61 to the fixing member 71. A communication hole 74 for forming communication between the capacitor element 61 and the upper lid 63 is formed on the fixing member 71. As shown in FIG. 4, four openings 75 for inserting a jig 76 thereinto are formed on the fixing member 71 so as to correspond to the two metallic rivets 65. By inserting forks 76a and 76b of the jig 76 through the openings 75, each of the forks 76a and 76b is arranged to grip, from outside, the other end portion of each of the metallic rivets 65 passing through the through-holes 72 of the fixing member 71.

The capacitor element 61, the fixing member 71, the metallic rivets 65, the upper lid 63, etc. provided integrally as described above are accommodated in the metallic casing 62 which contains fixing agent 77 and is subjected to transverse drawing in the vicinity of the mouth so as to have a transverse drawing portion 62a. A distal end of the mouth of the metallic casing 62 is subjected to curling so as to retain the fixing member 71, the upper lid 63, etc.

FIG. 3B shows a state in which the open circuit mode mechanism of the electrolytic capacitor K3 of FIG. 3A is actuated. Namely, in case pressure in the metallic casing 62 rises due to a malfunction of the electrolytic capacitor K3, the pressure is applied to the upper lid 63 through the communication hole 74 of the fixing member 71 so as to deform the upper lid 63 such that the upper lid 63 swells out upwardly. However, since a central portion of the upper lid 63 is retained by the insulating member 66 and the resinous laminated board 69, only an outer peripheral portion of the upper lid 63, which is not retained by the insulating member 66 and the resinous laminated board 69, is deformed upwardly. In response to this upward deformation of the outer peripheral portion of the upper lid 63, the metallic rivets 65 secured to the upper lid 63 are also pulled upwardly by the upper lid 63, so that the connections of ultrasonic welding between the lead-out lead plates 73 from the capacitor element 61 disposed below the fixing member 71 and the metallic rivets 65 are also pulled upwardly by the metallic rivets 65. In this case, the through-hole 72 for inserting the metallic rivet 65 therethrough in the fixing member 71 is set at an area smaller than that of lead-out lead plate 73 at the connection between the lead-out lead plate 73 and the metallic rivet 65. Therefore, even if the lead-out lead plate 73 would penetrate into the through-hole 72 in response to upward movement of the metallic rivet 65, the lead-out lead plate 73 is not capable of penetrating into the through-hole 72. As a result, the connection of ultrasonic welding between each of the metallic rivets 65 and each of the lead-out lead plates 73 is cut off by an edge of each of the through-holes 72 and thus, an electric circuit of the electrolytic capacitor K3 is broken.

Accordingly, the electrolytic capacitor K3 eliminates such drawbacks of the prior art electrolytic capacitor including the metallic casing having the weak spot formed by the thin wall portion of the bottom that misty driving electrolyte spouted out of the metallic casing soils interior of the electronic appliance incorporating the prior art electrolytic capacitor and is mistaken for smoke due to a fire.

Meanwhile, since the central portion of the upper lid 63, which is retained by the insulating member 66 and the resinous laminated board 69, is not deformed, interval between the external connection terminals 70 does not change. Thus, not to mention, in a lug terminal type in which the external connection terminals 70 are not retained by a printed circuit board or the like and also in another type in which the external connection terminals 70 are retained by a printed circuit board or the like, the open circuit mode mechanism of the electrolytic capacitor K3 functions properly. In addition, such a problem is also eliminated that the printed circuit board is damaged by increase of interval of the external connection terminals 70.

Furthermore, in the electrolytic capacitor K3, the openings 75 for inserting therethrough the jig 76 for gripping, from outside, the other end portion of each of the metallic rivets 65 pierced through the through-holes 72 of the fixing member 71 are formed on the fixing member 71. Therefore, in case the other end of each of the metallic rivets 65 passing through the through-holes 72 of the fixing member 71 and projecting out of the fixing member 71 in the direction opposite to the upper lid 63 and each of the lead-out lead plates 73 from the capacitor element 61 are subjected to metallic junction by ultrasonic welding so as to be electrically connected to each other, this metallic junction can be performed easily and positively.

Namely, in case the other end of each of the metallic rivets 65 and each of the lead-out lead plates 73 from the capacitor element 61 are subjected to metallic junction by ultrasonic welding, it is important for securing reliability and strength of the junction to hold and secure a portion of each of the metallic rivets 65 adjacent to the junction location. If each of the metallic rivets 65 passing through the through-holes 72 of the fixing member 71 and projecting out of the fixing member 71 in the direction opposite to the upper lid 63 is held and secured at one side of each of the metallic rivets 65 adjacent to the capacitor element 61 and the distal end of each of the metallic rivets 65 and each of the lead-out lead plates 73 are subjected to metallic junction, a projecting distance of each of the metallic rivets 65 from the lower face of the fixing member 71 to the metallic junction distal end of each of the metallic rivets 65 should be of such a length as to hold and secure the metallic rivets 65 with a jig and thus, would become rather long. If the projecting distance of each of the metallic rivets 65 becomes long as described above, the following undesirable phenomenon may happen. Namely, when the upper lid 63 is deformed upwardly in response to rise of pressure in the metallic casing 62 due to a malfunction of the electrolytic capacitor and the metallic rivets 65 are pulled upwardly by the upper lid 63 and the connection of ultrasonic welding between each of the metallic rivets 65 and each of the lead-out lead plates 73 is cut off by an edge of each of the through-holes 72 for passing the metallic rivets 65 therethrough in the fixing member 71, travel distance of each of the metallic rivets 65 will become long, thereby resulting in deterioration of reliability and response property of the electrolytic capacitor.

However, in the electrolytic capacitor K3, the openings 75 for inserting thereinto the jig 76 for gripping, from outside, the other end of each of the metallic rivets 65 passing through the through-holes 72 of the fixing member 71 are formed on the fixing member 71. Therefore, in case the other end of each of the metallic rivets 65 passing through the through-holes 72 of the fixing member 71 and projecting out of the fixing member 71 in the direction opposite to the upper lid 63 and each of the lead-out lead plates 73 from the capacitor element 61 are subjected to metallic junction by ultrasonic welding, the forks 76a and 76b of the jig 76 are inserted through the openings 75 so as to grip, from outside, the other end portion of each of the metallic rivets 65 passing through the through-holes 72 of the fixing member 71. As a result, metallic junction between the other end of each of the metallic rivets 65 and each of the lead-out lead plates 73 from the capacitor element 61 can be performed easily and positively. Furthermore, the projecting distance of each of the metallic rivets 65 from the fixing member 71 can be shortened by forming the openings 75 on the fixing member 71. Consequently, in case the connection of ultrasonic welding between each of the metallic rivets 65 and each of the lead-out lead plates 73 is cut off by a malfunction of the electrolytic capacitor K3, reliability and response property of the electrolytic capacitor K3 can be upgraded.

Fourth Embodiment

Figure 5:
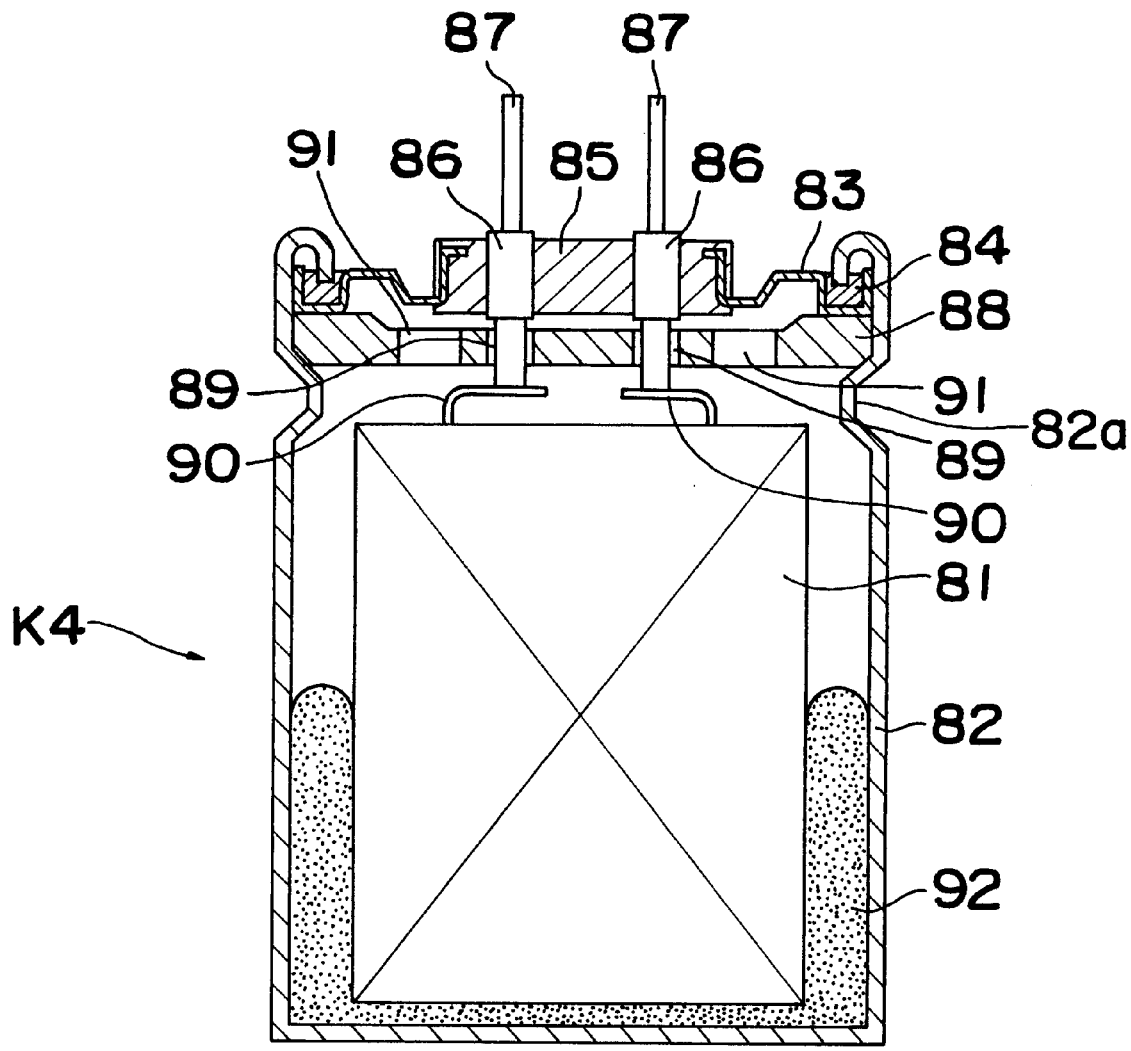
FIG. 5 is a longitudinal sectional view of an electrolytic capacitor with an open circuit mode mechanism, according to a fourth embodiment of the present invention.

FIG. 5 shows an electrolytic capacitor K4 with an open circuit mode mechanism, according to a fourth embodiment of the present invention. An anode foil and a cathode foil are wound so as to interpose a separator therebetween in a capacitor element 81. After the capacitor element 81 has been impregnated with driving electrolyte, the capacitor element 81 is accommodated in a cylindrical metallic casing 82 made of, for example, aluminum and having a bottom. A metallic upper lid 83 for closing a mouth of the metallic casing 82 is mounted on the mouth of the metallic casing 82 through an annular packing 84 made of elastic rubber. A terminal fixing member 85 made of resin is attached to the upper lid 83. A pair of metallic rivets 86 made of, for example, aluminum are integrally held by the terminal fixing member 85 at the time of molding of the terminal fixing member 85. An external connection terminal 87 is connected to one end portion of each of the metallic rivets 86. A fixing member 88 molded by resin is formed with a pair of through-holes 89 each for passing the other end portion of each of the metallic rivets 86 therethrough. The other end of each of the metallic rivets 86 passing through the through-holes 89 of the fixing member 88 and projecting out of the fixing member 88 in the direction opposite to the upper lid 83 and each of a pair of lead-out lead plates 90 drawn from the capacitor element 81 are subjected to metallic junction by ultrasonic welding so as to be electrically connected to each other. The through-hole 89 of the fixing member 88 is set at a diameter of such a small dimensional allowance that the other end portion of each of the metallic rivets 86 can be barely inserted thereinto. A plurality of communication holes 91 for forming communication between the capacitor element 81 and the upper lid 83 are formed on the fixing member 88.

The capacitor element 81, the fixing member 88, the upper lid 83, etc. provided integrally as described above are accommodated in the metallic casing 82 which contains fixing agent 92 and is subjected to transverse drawing in the vicinity of the mouth so as to have a transverse drawing portion 82a. A distal end of the mouth of the metallic casing 82 is subjected to curling so as to retain the fixing member 88, the upper lid 83, etc.

In the electrolytic capacitor K4 with the open circuit mode mechanism, according to the fourth embodiment of the present invention as shown in FIG. 5, in case pressure in the metallic casing 82 rises due to a malfunction of the electrolytic capacitor K4, the pressure is applied to the upper lid 83 through the communication holes 91 of the fixing member 88 so as to deform the upper lid 83 such that the upper lid 83 swells out upwardly. In response to this deformation of the upper lid 83, the metallic rivets 86 are also pulled upwardly by the upper lid 83, so that the connections of ultrasonic welding between the lead-out lead plates 90 from the capacitor element 81 disposed below the fixing member 88 and the metallic rivets 86 are also pulled upwardly by the metallic rivets 86. In this case, the through-hole 89 for inserting the metallic rivet 86 therethrough is set at an area smaller than that of the lead-out lead plate 90 at the connection between lead-out lead plate 90 and the metallic rivet 86. Therefore, even if the lead-out lead plate 90 would penetrate into the through-hole 89 in response to upward movement of the metallic rivet 86, the lead-out lead plate 90 is not capable of penetrating into the through-hole 89. As a result, the connection of ultrasonic welding between each of the metallic rivets 86 and each of the lead-out lead plates 90 is cut off by an edge of each of the through-holes 89 and thus, an electric circuit of the electrolytic capacitor K4 is broken.

Accordingly, the electrolytic capacitor K4 eliminates such disadvantages of the prior art electrolytic capacitor including the metallic casing having the weak spot formed by the thin wall portion of the bottom that misty driving electrolyte spouted out of the metallic casing soils interior of the electronic appliance incorporating the prior art electrolytic capacitor and is mistaken for smoke due to a fire.

Meanwhile, in the electrolytic capacitor K4, since the metallic rivets 86 each having the external connection terminal 87 connected to its one end portion are integrally held by the terminal fixing member 85 at the time of molding of the terminal fixing member 85 attached to the upper lid 83, interval between the external connection terminals 87 is fixed. Therefore, the electrolytic capacitor K4 can be quite usefully applied to an electrolytic capacitor of a type in which a pair of the external connection terminals are inserted into holes of a printed circuit board of an electronic appliance.

Namely, in the electrolytic capacitor K1 of FIG. 1, the insulating member 36 molded by phenol resin is mounted on one end portion of each of the metallic rivets 35 so as to partially penetrate into the through-hole 37 of the upper lid 33 such that the external connection terminal 39 is connected to the one end portion of each of the metallic rivets 35. Therefore, in the electrolytic capacitor K1, in case pressure in the metallic casing 32 rises due to a malfunction of the electrolytic capacitor K1 and the upper lid 33 is deformed upwardly in response to this rise of the pressure, interval between the external connection terminals 39 connected to the one end portion of each of the metallic rivets 35 will be increased. If the interval between the external connection terminals 39 inserted into holes of a printed circuit board of an electronic appliance is increased, the metallic rivets 35 are not pulled upwardly by the upper lid 33 in response to upward deformation of the upper lid 33. As a result, there are such risks that the connection of ultrasonic welding between each of the lead-out lead plates 42 from the capacitor element 31 and each of the metallic rivets 35 is not cut off properly and fractures or cracks are produced in the vicinity of the holes of the printed circuit board of the electronic appliance.

On the other hand, in the electrolytic capacitor K4 of FIG. 5, the metallic rivets 86 each having the external connection terminal 87 connected to its one end portion are integrally held by the terminal fixing member 85 at the time of molding of the terminal fixing member 85 attached to the upper lid 83. Therefore, in case pressure in the metallic casing 82 rises due to a malfunction of the electrolytic capacitor K4 and the upper lid 83 is deformed upwardly in response to this rise of the pressure, the terminal fixing member 85 attached to the upper lid 83 is also deformed upwardly integrally with the upper lid 83. As a result, such a phenomenon is eliminated that interval between the external connection terminals 87 at the metallic rivets 86 integrally held by the terminal fixing member 85 is increased in response to upward deformation of the upper lid 83. Therefore, in the case where the external connection terminals 87 are inserted into the holes of the printed circuit board of the electronic appliance, neither fractures nor cracks are produced in the vicinity of the holes of the printed circuit board.

Fifth Embodiment

Figure 6:
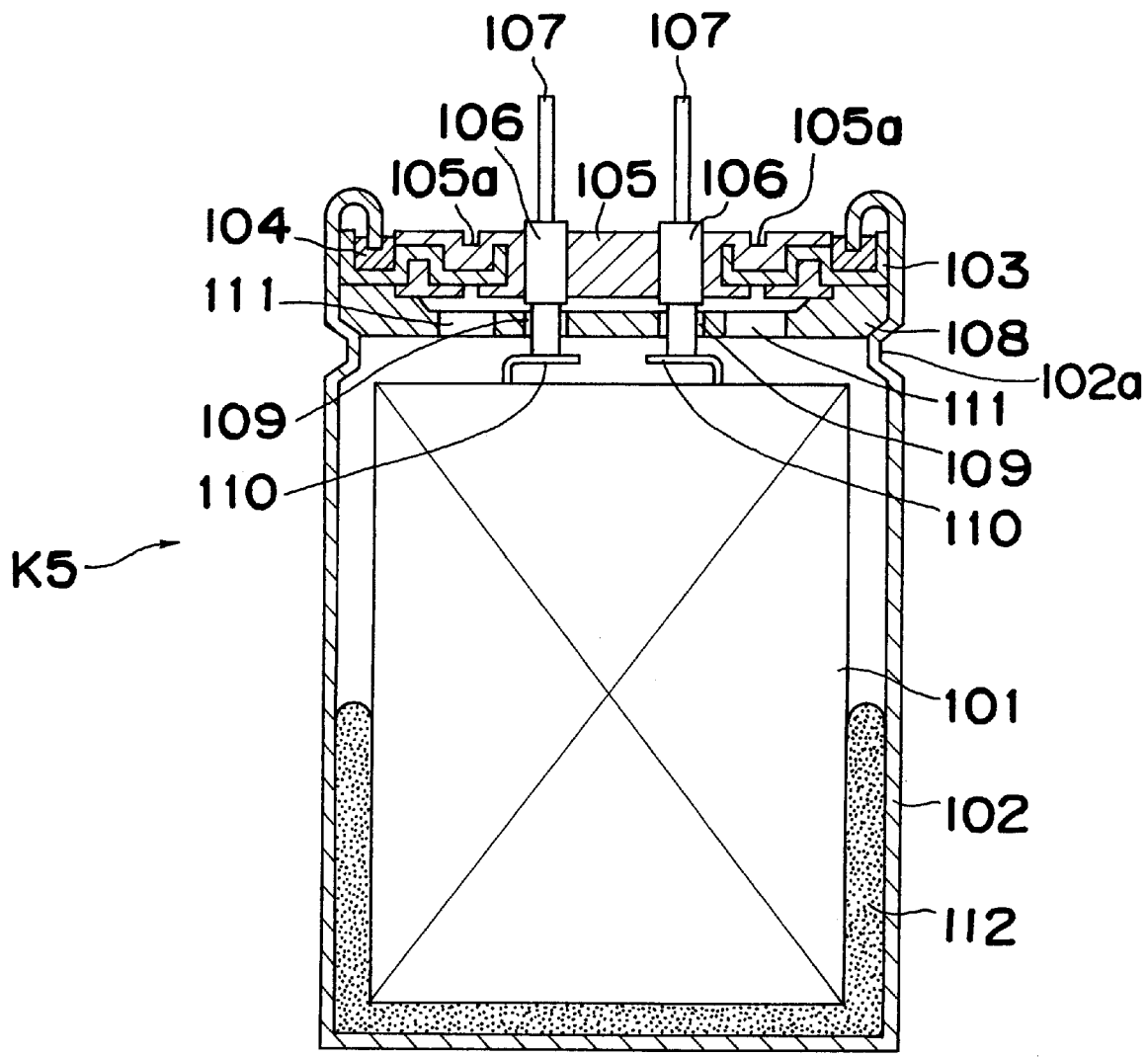
FIG. 6 is a longitudinal sectional view of an electrolytic capacitor with an open circuit mode mechanism, according to a fifth embodiment of the present invention.

FIG. 6 shows an electrolytic capacitor K5 with an open circuit mode mechanism, according to a fifth embodiment of the present invention. An anode foil and a cathode foil are wound so as to interpose a separator therebetween in a capacitor element 101. After the capacitor element 101 has been impregnated with driving electrolyte, the capacitor element 101 is accommodated in a cylindrical metallic casing 102 made of, for example, aluminum and having a bottom. A metallic upper lid 103 for closing a mouth of the metallic casing 102 is mounted on the mouth of the metallic casing 102 through an annular packing 104 made of elastic rubber. A terminal fixing member 105 made of resin is attached to the upper lid 103. A pair of metallic rivets 106 made of, for example, aluminum are integrally held by the terminal fixing member 105 at the time of molding of the terminal fixing member 105. An external connection terminal 107 is connected to one end portion of each of the metallic rivets 106. A fixing member 108 molded by resin is formed with a pair of through-holes 109 each for passing the other end portion of each of the metallic rivets 106 therethrough. The other end of each of the metallic rivets 106 passing through the through-holes 109 of the fixing member 108 and projecting out of the fixing member 108 in the direction opposite to the upper lid 103 and each of a pair of lead-out lead plates 110 drawn from the capacitor element 101 are subjected to metallic junction by ultrasonic welding so as to be electrically connected to each other. The through-hole 109 of the fixing member 108 is set at a diameter of such a small dimensional allowance that the other end portion of each of the metallic rivets 106 can be barely inserted thereinto. A plurality of communication holes 111 for forming communication between the capacitor element 101 and the upper lid 103 are formed on the fixing member 108. Meanwhile, an annular weak portion 105a formed by a thin wall portion of low mechanical strength is provided at a portion of a peripheral edge of the terminal fixing member 105.

The capacitor element 101, the fixing member 108, the upper lid 103, etc. provided integrally as described above are accommodated in the metallic casing 102 which contains fixing agent 112 and is subjected to transverse drawing in the vicinity of the mouth so as to have a transverse drawing portion 102a. A distal end of the mouth of the metallic casing 102 is subjected to curling so as to retain the fixing member 108, the upper lid 103, etc.

In the electrolytic capacitor K5 with the open circuit mode mechanism, according to the fifth embodiment of the present invention as shown in FIG. 6, in case pressure in the metallic casing 102 rises due to a malfunction of the electrolytic capacitor K5, the pressure is applied to the upper lid 103 through the communication holes 111 of the fixing member 108 so as to deform the upper lid 103 such that the upper lid 103 swells out upwardly. In response to this deformation of the upper lid 103, the metallic rivets 106 are also pulled upwardly by the upper lid 103, so that the connections of ultrasonic welding between the lead-out lead plates 110 from the capacitor element 101 disposed below the fixing member 108 and the metallic rivets 106 are also pulled upwardly by the metallic rivets 106. In this case, the through-hole 109 for inserting the metallic rivet 106 therethrough is set at an area smaller than that of the lead-out lead plate 110 at the connection between lead-out lead plate 110 and the metallic rivet 106. Therefore, even if the lead-out lead plate 110 would penetrate into the through-hole 109 in response to upward movement of the metallic rivet 106, the lead-out lead plate 110 is not capable of penetrating into the through-hole 109. As a result, the connection of ultrasonic welding between each of the metallic rivets 106 and each of the lead-out lead plates 110 is cut off by an edge of each of the through-holes 109 and thus, an electric circuit of the electrolytic capacitor K5 is broken.

Accordingly, the electrolytic capacitor K5 eliminates such disadvantages of the prior art electrolytic capacitor including the metallic casing having the weak spot formed by the thin wall portion of the bottom that misty driving electrolyte spouted out of the metallic casing soils interior of the electronic appliance incorporating the prior art electrolytic capacitor and is mistaken for smoke due to a fire.

In the electrolytic capacitor K5, operating efficiency of the open circuit mode mechanism is improved greatly. Namely, the annular weak portion 105a formed by the thin wall thickness portion of low mechanical strength is provided at the portion of the peripheral edge of the terminal fixing member 105. Therefore, in case pressure in the metallic casing 102 rises due to a malfunction of the electrolytic capacitor K5, the upper lid 103 and the terminal fixing member 105 are integrally deformed upwardly in response to this rise of the pressure, so that the weak portion 105a of low mechanical strength in the terminal fixing member 105 is initially fractured at a predetermined pressure and thus, the terminal fixing member 105 is displaced suddenly. As a result, the connection between each of the lead-out lead plates 110 and each of the metallic rivets 106 is also pulled upwardly suddenly in response to this displacement of the terminal fixing member 105 and thus, is cut off by an edge of each of the through-holes 109 of the fixing member 108, thereby resulting in remarkable improvement of operating efficiency of the open circuit mode mechanism of the electrolytic capacitor K5.

Sixth Embodiment

Figure 7:
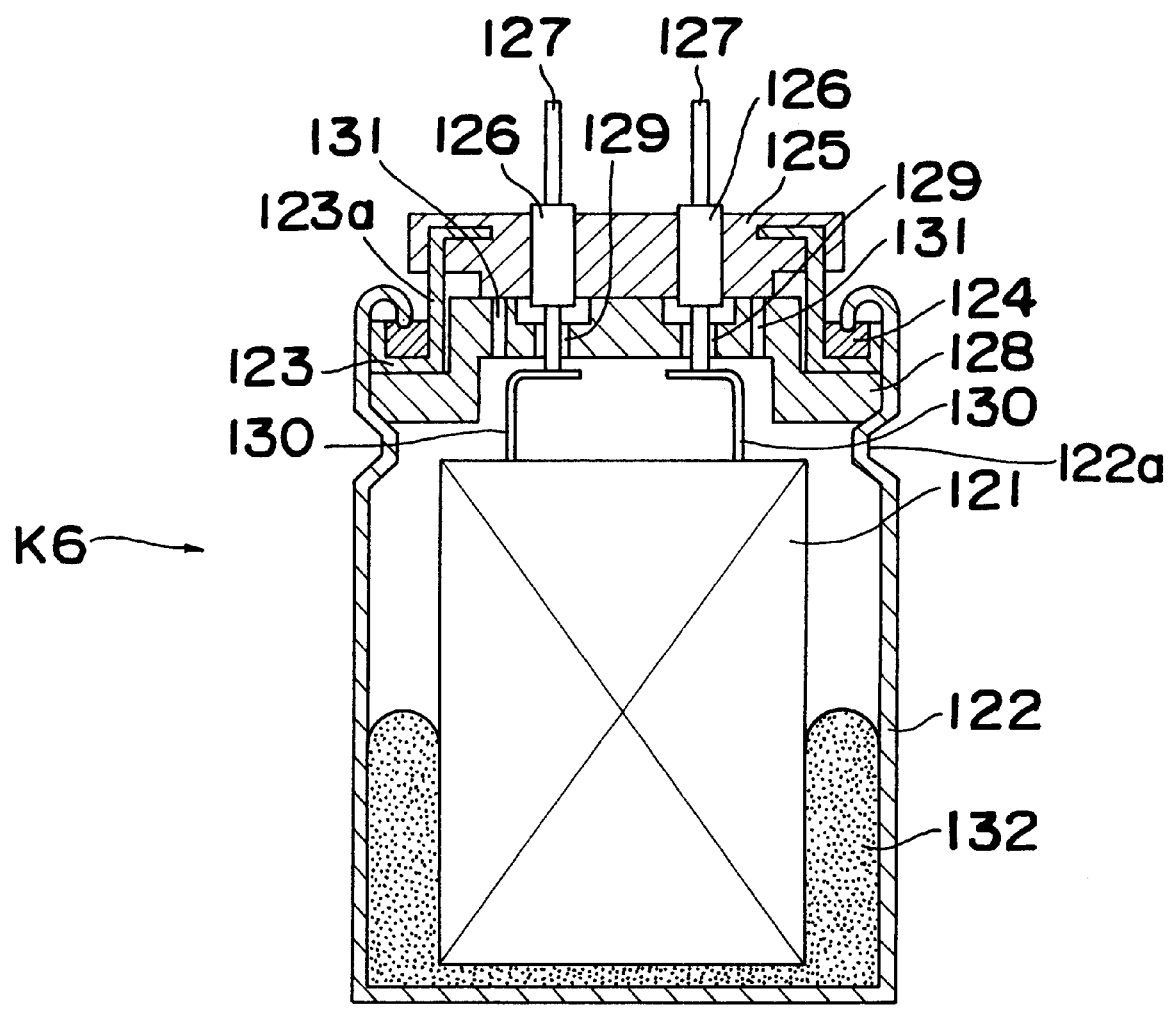
FIG. 7 is a longitudinal sectional view of an electrolytic capacitor with an open circuit mode mechanism, according to a sixth embodiment of the present invention.
Figure 8:
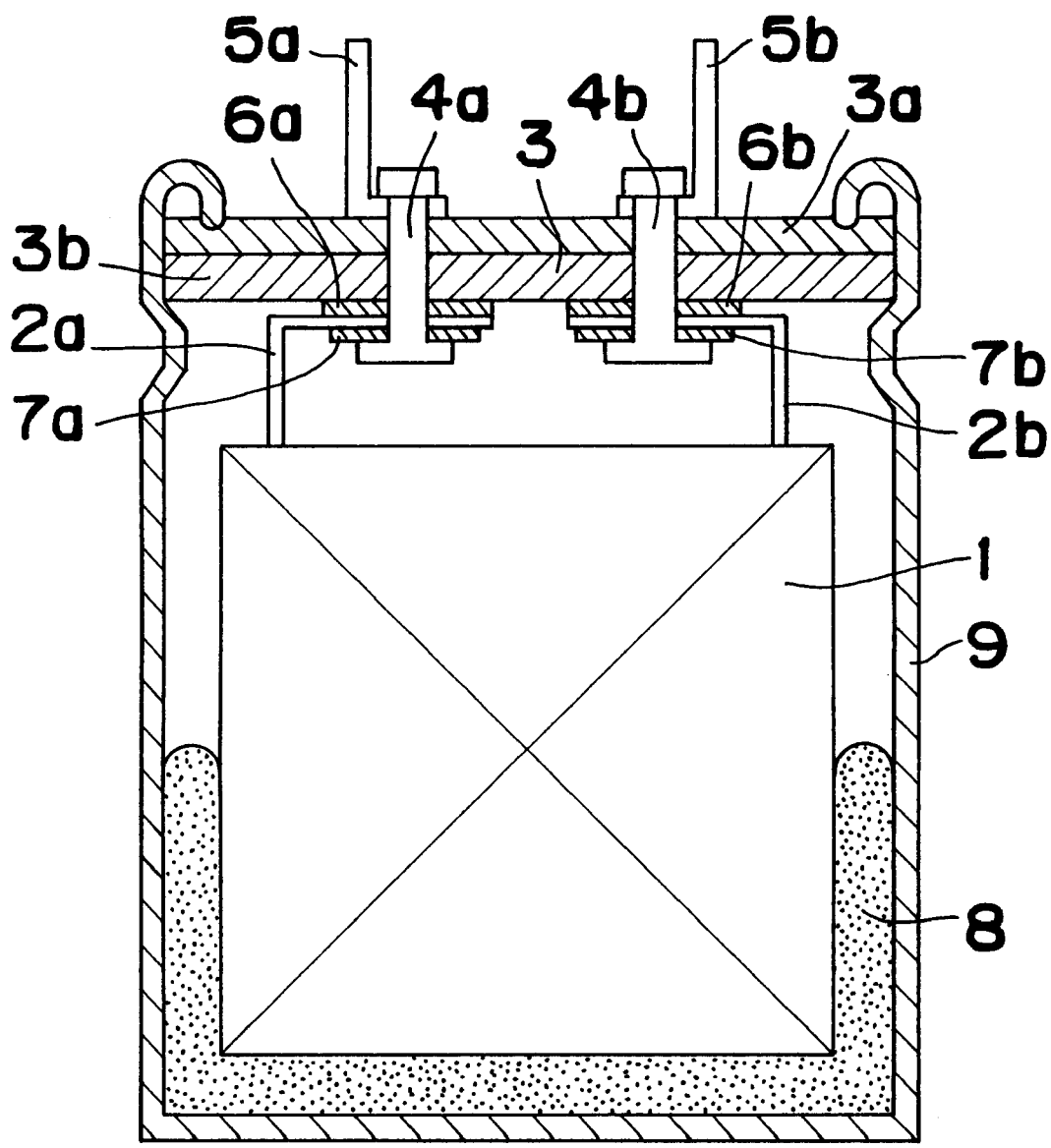
FIG. 8 is a longitudinal sectional view of a prior art electrolytic capacitor.
Figure 9A:
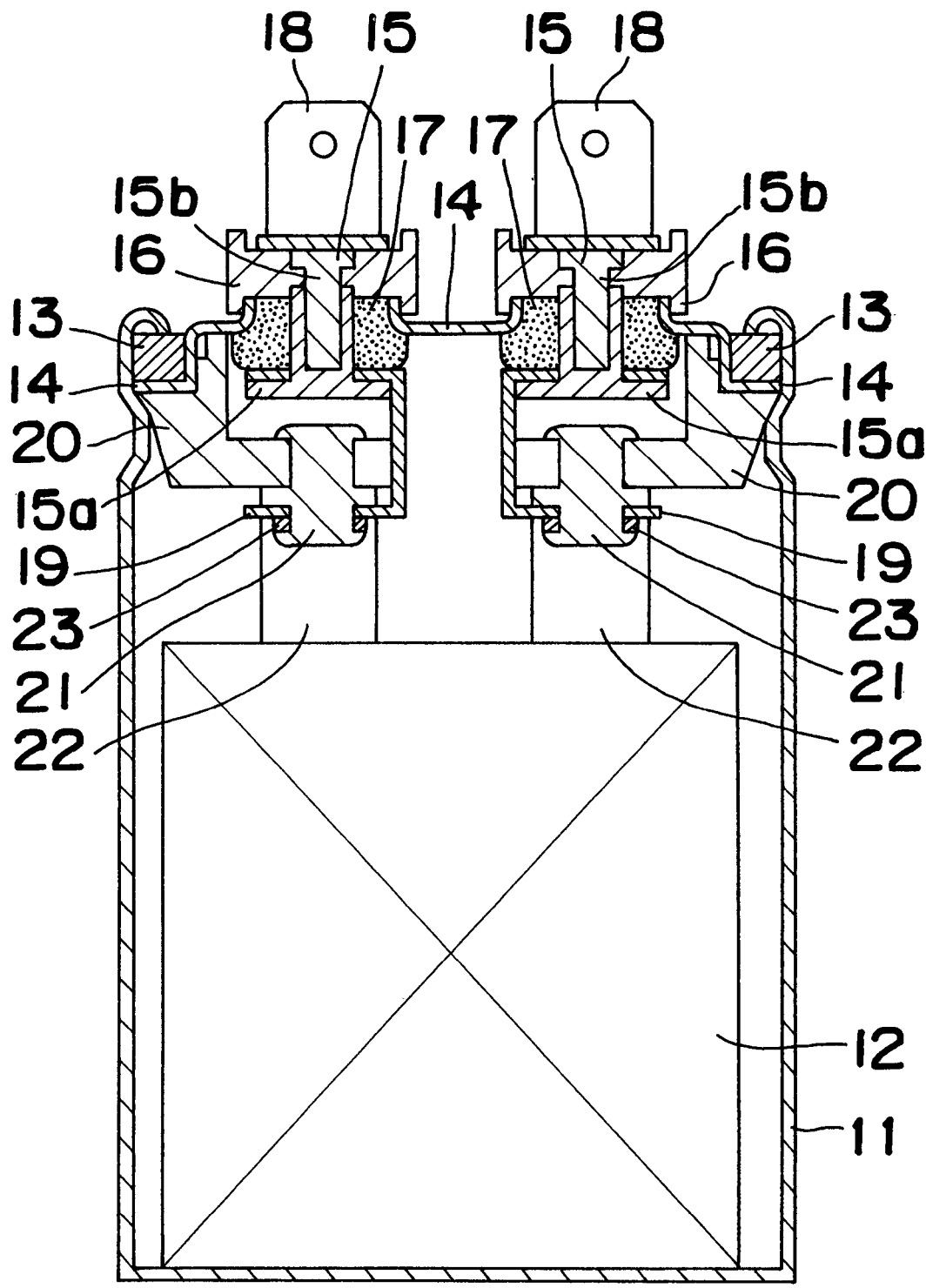
FIGS. 9A and 9B are longitudinal sectional views of another prior art electrolytic capacitor with an open circuit mode mechanism.
Figure 9B:
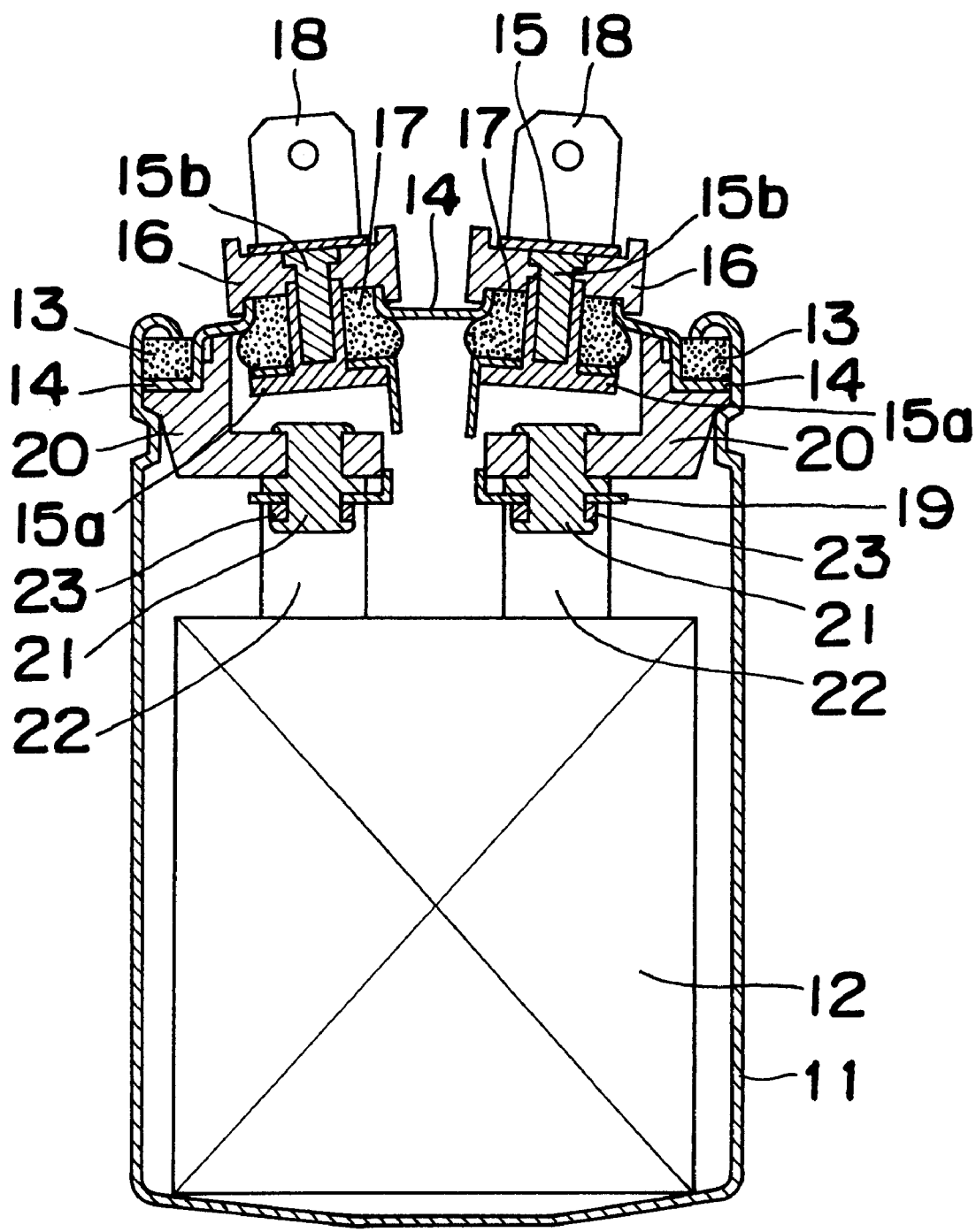

FIG. 7 shows an electrolytic capacitor K6 with an open circuit mode mechanism, according to a sixth embodiment of the present invention. An anode foil and a cathode foil are wound so as to interpose a separator therebetween in a capacitor element 121. After the capacitor element 121 has been impregnated with driving electrolyte, the capacitor element 121 is accommodated in a cylindrical metallic casing 122 made of, for example, aluminum and having a bottom. A metallic upper lid 123 for closing a mouth of the metallic casing 122 is mounted on the mouth of the metallic casing 122 through an annular packing 124 made of elastic rubber. A terminal fixing member 125 made of resin is attached to the upper lid 123. A pair of metallic rivets 126 made of, for example, aluminum are integrally held by the terminal fixing member 125 at the time of molding of the terminal fixing member 125. An external connection terminal 127 is connected to one end portion of each of the metallic rivets 126. A fixing member 128 molded by resin is formed with a pair of through-holes 129 each for passing the other end portion of each of the metallic rivets 126 therethrough. The other end of each of the metallic rivets 126 passing through the through-holes 129 of the fixing member 128 and projecting out of the fixing member 128 in the direction opposite to the upper lid 123 and each of a pair of lead-out lead plates 130 drawn from the capacitor element 121 are subjected to metallic junction by ultrasonic welding so as to be electrically connected to each other. The through-hole 129 of the fixing member 128 is set at a diameter of such a small dimensional allowance that the other end portion of each of the metallic rivets 126 can be barely inserted thereinto. A plurality of communication holes 131 for forming communication between the capacitor element 121 and the upper lid 123 are formed on the fixing member 128. Meanwhile, a longitudinally extending cylindrical plastic elongation portion 123a is integrally formed at a peripheral edge of the upper lid 123. This plastic elongation portion 123a is elastically deformed at a pressure less than a predetermined value but is plastically deformed at a pressure not less than the predetermined value so as to suddenly deform the upper lid 123 upwardly.

The capacitor element 121, the fixing member 128, the upper lid 123, etc. provided integrally as described above are accommodated in the metallic casing 122 which contains fixing agent 132 and is subjected to transverse drawing in the vicinity of the mouth so as to have a transverse drawing portion 122a. A distal end of the mouth of the metallic casing 122 is subjected to curling so as to retain the fixing member 128, the upper lid 123, etc.

In the electrolytic capacitor K6 with the open circuit mode mechanism, according to the sixth embodiment of the present invention as shown in FIG. 7, in case pressure in the metallic casing 122 rises due to a malfunction of the electrolytic capacitor K6, the pressure is applied to the terminal fixing member 125 through the communication holes 131 of the fixing member 128 so as to deform the upper lid 123 upwardly by way of the terminal fixing member 125. In this case, since the longitudinally extending cylindrical plastic elongation portion 123a is integrally formed at the peripheral edge of the upper lid 123, the upper lid 123 is arranged to be elastically deformed at a pressure less than the predetermined value but be plastically deformed at a pressure not less than the predetermined value. As a result, since the upper lid 123 is suddenly deformed upwardly, the connection between each of the lead-out lead plates 130 and each of the metallic rivets 126 is also suddenly pulled upwardly and is cut off by an edge of each of the through-holes 129 of the fixing member 128, so that an electric circuit of the electrolytic capacitor K6 is broken.

Accordingly, the electrolytic capacitor K6 eliminates such disadvantages of the prior art electrolytic capacitor including the metallic casing having the weak spot formed by the thin wall portion of the bottom that misty driving electrolyte spouted out of the metallic casing soils interior of the electronic appliance incorporating the prior art electrolytic capacitor and is mistaken for smoke due to a fire. In addition, operating efficiency of the open circuit mode mechanism of the electrolytic capacitor K6 is improved remarkably.

Meanwhile, in the above mentioned embodiments of the present invention, metallic junction between the other end of each of the metallic rivets and each of the lead-out lead plates from the capacitor element is performed by ultrasonic welding but is not limited to ultrasonic welding. For example, ultrasonic welding may be replaced by one of laser welding, cold pressure welding and crimping.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

Industrial Applicability

In the above mentioned electrolytic capacitor with the open circuit mode mechanism, according to the present invention, the upper lid is mounted, through the packing, on the mouth of the cylindrical metallic casing having the bottom and a pair of the metallic rivets are fixed to the upper lid so as to be passed through the upper lid. Furthermore, each of a pair of the external connection terminals is connected to one end portion of each of the metallic rivets, while the other end portion of each of the metallic rivets is passed through each of the through-holes formed on the fixing member molded by resin. In addition, the other end of each of the metallic rivets passing through each of the through-holes of the fixing member and projecting out of the fixing member in the direction opposite to the upper lid and each of a pair of the lead-out lead plates from the capacitor element accommodated in the metallic casing are connected to each other by metallic junction.

In case pressure in the metallic casing rises due to a malfunction of the electrolytic capacitor, the upper lid is deformed upon this rise of the pressure so as to swell out. In response to this deformation of the upper lid, the metallic rivets fixed to the upper lid are lifted in the direction away from the capacitor element. As a result, the metallic connection between the other end of each of the metallic rivets and each of the lead-out lead plates from the capacitor element is cut off and thus, the electric circuit of the electrolytic capacitor is broken.

Therefore, the electrolytic capacitor of the present invention eliminates such drawbacks of the prior art electrolytic capacitor including the metallic casing having the weak spot formed by the thin wall portion of the bottom that misty driving electrolyte spouted out of the metallic casing soils interior of the electronic appliance incorporating the prior art electrolytic capacitor and is mistaken for smoke due to a fire.

Meanwhile, in the present invention, since components provided in a flow path of electric current from the external connection terminals to the capacitor element are merely the metallic rivets and the lead-out lead plates, the electrolytic capacitor is structurally simplified. Furthermore, in the present invention, since the number of connections in the electrolytic capacitor is reduced substantially in comparison with that of a known electrolytic capacitor with an open circuit mode mechanism, the electrolytic capacitor is quite useful in terms of the number of its assembly steps and reliability of the connections.

In addition, in the present invention, since a weak spot having a reduced cross-sectional area as in the case of the known electrolytic capacitor with the open circuit mode mechanism is not provided in the electric circuit of the electrolytic capacitor, such a problem of the known electrolytic capacitor is eliminated that since the weak spot having the reduced cross-sectional area is heated due to its large electric resistance, ripple current (AC) capacity is sacrificed, thereby resulting in great safety of the electrolytic capacitor with the open circuit mode mechanism.

What is claimed is:

1. An electrolytic capacitor comprising:
   a capacitor element impregnated with electrolyte and having a pair of lead-out lead plates;
   a cylindrical metallic casing including a bottom, a curled end forming a mouth, and a transverse drawing portion at said mouth, said capacitor element being accommodated in said casing;
   a lid for enclosing said mouth of said casing, said lid having a peripheral portion;
   a pair of metallic rivets secured to and extending through said lid, each of said rivets having a first end and a second end;
   a pair of external connection terminals, each of said terminals being connected to said first end of one of said rivets;

a jig for gripping said second end of each of said rivets;

a fixing member formed of resin and having a pair of through-holes, at least one communication hole for allowing communication between said capacitor element and said lid, a peripheral portion positioned on said transverse drawing portion of said casing, and a jig opening for allowing insertion of said jig, said peripheral portion of said lid being positioned on said peripheral portion of said fixing member, said second end of each of said rivets being positioned in one of said through-holes so as to project from said fixing member in a direction away from said lid, said second end of each of said rivets being metallically joined to one of said lead plates, wherein each of said through-holes has an area smaller than an area of each of said lead plates at a point where each of said rivets is connected to one of said lead plates; and packing positioned on said peripheral portion of said lid, wherein said packing, said peripheral portion of said lid, and said peripheral portion of said fixing member are hermetically secured to said casing between said transverse drawing portion of said casing and said curled end of said casing.

2. An electrolytic capacitor comprising:

a capacitor element impregnated with electrolyte and having a pair of lead-out lead plates;

a cylindrical metallic casing including a bottom, a curled end forming a mouth, and a transverse drawing portion at said mouth, said capacitor element being accommodated in said casing;

a lid for enclosing said mouth of said casing, said lid having a peripheral portion;

a terminal fixing member formed of resin and secured to said lid, said terminal fixing member having a weak portion low in mechanical strength;

a pair of metallic rivets integrally held by said terminal fixing member, each of said rivets having a first end and a second end;

a pair of external connection terminals, each of said terminals being connected to said first end of one of said rivets;

a fixing member formed of resin and having a pair of through-holes, at least one communication hole for allowing communication between said capacitor element and said lid, and a peripheral portion positioned on said transverse drawing portion of said casing, said peripheral portion of said lid being positioned on said peripheral portion of said fixing member, said second end of each of said rivets being positioned in one of said through-holes so as to project from said fixing member in a direction away from said lid, said second end of each of said rivets being metallically joined to one of said lead plates, wherein each of said through-holes has an area smaller than an area of each of said lead plates at a point where each of said rivets is connected to one of said lead plates; and packing positioned on said peripheral portion of said lid, wherein said packing, said peripheral portion of said lid, and said peripheral portion of said fixing member are hermetically secured to said casing between said transverse drawing portion of said casing and said curled end of said casing.

3. An electrolytic capacitor comprising:

a capacitor element impregnated with electrolyte and having a pair of lead-out lead plates;

a cylindrical metallic casing including a bottom, a curled end forming a mouth, and a transverse drawing portion at said mouth, said capacitor element being accommodated in said casing;

a lid for enclosing said mouth of said casing, said lid having a peripheral portion and a longitudinal plastic elongation portion;

a terminal fixing member formed of resin and secured to said lid;

a pair of metallic rivets integrally held by said terminal fixing member, each of said rivets having a first end and a second end a pair of external connection terminals, each of said terminals being connected to said first end of one of said rivets;

a fixing member formed of resin and having a pair of through-holes, at least one communication hole for allowing communication between said capacitor element and said lid, and a peripheral portion positioned on said transverse drawing portion of said casing, said peripheral portion of said lid being positioned on said peripheral portion of said fixing member, said second end of each of said rivets being positioned in one of said through-holes so as to project from said fixing member in a direction away from said lid, said second end of each of said rivets being metallically joined to one of said lead plates, wherein each of said through-holes has an area smaller than an area of each of said lead plates at a point where each of said rivets is connected to one of said lead plates; and packing positioned on said peripheral portion of said lid, wherein said packing, said peripheral portion of said lid, and said peripheral portion of said fixing member are hermetically secured to said casing between said transverse drawing portion of said casing and said curled end of said casing.

4. An electrolytic capacitor comprising:

a capacitor element impregnated with electrolyte and having a pair of lead-out lead plates;

a metallic casing including a bottom, a curled end forming a mouth, and a transverse drawing portion at said mouth, said capacitor element being accommodated in said casing;

a lid for enclosing said mouth of said casing, said lid having a peripheral portion;

a pair of metallic rivets secured to and extending through said lid, each of said rivets having a first end and a second end;

a pair of external connection terminals, each of said terminals being connected to said first end of one of said rivets;

a fixing member formed of resin and secured to said capacitor element, said fixing member including a pair of through-holes, at least one communication hole for allowing communication between said capacitor element and said lid, and a peripheral portion positioned on said transverse drawing portion of said casing, said peripheral portion of said lid being positioned on said peripheral portion of said fixing member, said second end of each of said rivets being positioned in one of said through-holes so as to project from said fixing member in a direction away from said lid, said second end of each of said rivets being connected to one of said lead plates, wherein each of said through-holes has an area smaller than an area of each of said lead plates at a point where each of said rivets is connected to one of said lead plates; and packing positioned on said peripheral portion of said lid, wherein said packing, said peripheral portion of said lid, and said peripheral portion of said fixing member are hermetically secured to said casing between said transverse drawing portion of said casing and said curled end of said casing.

5. The electrolytic capacitor of claim 4, wherein said second end of each of said rivets is metallically joined to one of said lead plates.

6. The electrolytic capacitor of claim 5, wherein said second end of each of said rivets is connected to one of said lead plates by one of an ultrasonic welding connection, a laser welding connection, a cold pressure welding connection, and a crimping connection.

7. The electrolytic capacitor of claim 4, wherein said second end of each of said rivets is connected to one of said lead plates by one of an ultrasonic welding connection, a laser welding connection, a cold pressure welding connection, and a crimping connection.

8. The electrolytic capacitor of claim 4, wherein when pressure in said casing increases, only said peripheral portion of said lid is deformed such that a distance between said pair of external connection terminals is maintained constant.

9. The electrolytic capacitor of claim 4, wherein said casing has a cylindrical shape.

10. The electrolytic capacitor of claim 4, wherein said fixing member has a longitudinal projection, said capacitor element having a winding core cavity, said projection extending into said winding core cavity so as to secure said fixing member to said capacitor element.

11. The electrolytic capacitor of claim 10, wherein said fixing member and said projection are formed as a unitary member.

12. The electrolytic capacitor of claim 4, wherein said fixing member is unattached to said lid.

* * * * *